United States Patent [19]
King et al.

[11] Patent Number: 6,074,988
[45] Date of Patent: Jun. 13, 2000

[54] SOILLESS GROWTH MEDIUM INCLUDING SOLUBLE SILICON

[75] Inventors: Paul A. King, Johns Island, S.C.; Shivakumar Reddy, Fortuna, Calif.

[73] Assignee: SunGro Horticulture, Inc., Bellevue, Wash.

[21] Appl. No.: 09/007,160

[22] Filed: Jan. 14, 1998

Related U.S. Application Data

[60] Provisional application No. 60/035,117, Jan. 15, 1997.
[51] Int. Cl.⁷ .......................... A01N 59/00; A01N 59/06; C05F 11/02
[52] U.S. Cl. ................................................. 504/187; 71/24
[58] Field of Search .................................... 504/116, 187; 71/24

[56] References Cited

U.S. PATENT DOCUMENTS

| | | | |
|---|---|---|---|
| 3,748,783 | 7/1973 | Sokolies | 47/58 |
| 4,067,712 | 1/1978 | Willard, Sr. | 71/24 |
| 4,067,713 | 1/1978 | Willard, Sr. | 71/24 |
| 4,067,714 | 1/1978 | Willard, Sr. | 71/24 |
| 4,067,716 | 1/1978 | Sterrett | 71/24 |
| 4,074,997 | 2/1978 | Cohen | 71/24 |
| 4,293,523 | 10/1981 | Segawa et al. | 412/129 |
| 4,443,969 | 4/1984 | Hanacek et al. | |
| 4,551,165 | 11/1985 | Warner | 71/24 |
| 5,030,267 | 7/1991 | Vlnaty | 71/64.11 |
| 5,471,789 | 12/1995 | Clausen | 47/59 |

OTHER PUBLICATIONS

E. Epstein, The Anomaly of Silicon In Plant Biology, Proc. National Academy of Science, Jan. 1994, vol. 91, pp. 11–17.

S.F. Emandian et al., Growth Enhancement of Loblolly Pine (*Pinus taeda* L.) Seedlings by Silicon, J. Plant Physiology, 1989, vol. 134, pp. 98–103.

W.J. Horst et al., Effect of Silicon on Manganese Tolerance of Bean Plants (*Phaseolus Vugaris*), Plant and Soil, 1978, vol. 50, pp. 287–303.

M.H. Adatia et al., The Effects of Silicon on Cucumber Plants Grown in Recirculating Nutrient Solution, Annals of Botany, Mar. 8, 1986, vol. 58, pp. 343–351.

Y. Miyake et al., Silicon Deficiency of Tomato Plant, Soil Sci. Plant Nutrition, 1978, vol. 24(2), pp. 175–189.

Y. Miyake et al., Effect of Silicon on the Growth of Soybean Plants in a Solution Culture, Soil Sci. Plant Nutrition, 1985, vol. 31(4), pp. 625–636.

Y. Miyake et al., Effect of Silicon on the Growth And Fruit Production of Strawberry Plants in a Solution Culture, Soil Sci. Plant Nutrition, 1986, vol. 32(2), pp. 321–326.

W.L. Lindsay, Chemical Equilibria in Soils, Chapter 4, pp. 51–54, Chapter 7, pp. 87–92, John Wiley & Sons, New York.

Hackhs Chemical Dictionary, 4th Ed., McGraw–Hill Inc., 1969.

*Primary Examiner*—S. Mark Clardy
*Assistant Examiner*—Alton Pryor
*Attorney, Agent, or Firm*—Christen M. Millard; Kremblas, Foster, Millard & Pollick

[57] ABSTRACT

A soilless growth medium includes a core material and a repeating source of soluble silicon. Sufficient soluble silicon should be present in the medium such that plants grown in the soilless growth medium show at least a 100% increase in the concentration of silicon mineral in the plant than those grown in the core material alone. The concentration of silicon mineral in the soilless growth medium should be equal to at least that found in native soil.

20 Claims, No Drawings

SOILLESS GROWTH MEDIUM INCLUDING SOLUBLE SILICON

BACKGROUND OF THE INVENTION

This appln. claims the benefit of provisional appln. No. 60/035,117 filed Jan. 15, 1997.

FIELD OF THE INVENTION

This invention is a novel soilless germination and growth medium for plants, transplants, seeds, rooted cuttings, and the like. In particular, this invention is a soilless growth medium that provides for improved growth, improved health, and disease and insect resistance of plants grown in said media containing a novel and improved supply of nutrients. More particularly, this invention is a soilless growth medium containing a material or materials that provide soluble silicon to the plant in quantities sufficient to mimic the soluble silicon available in native soils.

DESCRIPTION OF THE RELATED ART

Before the 1950's, horticultural growing media for containers consisted primarily of mineral soils. Mineral soils have many drawbacks for growing plants in containers including low air capacities, low water holding abilities, too much weight and possible contamination with herbicides and other phytotoxic chemicals plus potential contamination by disease organisms. Almost all professional growers of ornamental and vegetable plants have switched to the soilless media or soilless media containing small percentages of soil or sand. Such media can be prepared from individual components such as sphagnum peat moss or bark. However, the mixes are generally prepared from mixtures listed below or similar materials. Common materials in use are sphagnum peat moss, hypnum peat, reed sedge peat, combusted bark, composted bark, fresh bark, composted organic wastes, perlite, an expanded volcanic ash, vermiculite, another expanded mineral, expanded plastics such as styrofoam and other locally available organic and inorganic materials. A typical mix for general growth of ornamental and bedding plants would consist of 50–75% sphagnum peat moss and 25–50% of aggregates such as vermiculite, perlite, bark or polystyrene. The choice of components is not critical but the physical properties are. It is essential that the media have satisfactory air and water capacities. This can be accomplished by controlling particle size and distribution.

These "soilless" media are often fortified with lime and/or dolomitic lime, to control the acidity, and fertilizer packages. Many mixes contain nitrogen from various ammonium and nitrate salts and condensation products of aldehydes and urea; phosphorus from single or triple superphosphate, calcium phosphate, ammonium and potassium phosphates; potassium supplied from salts such as potassium nitrate, potassium phosphate and potassium chloride; calcium from lime products, calcium nitrate, or sulphate; magnesium from dolomitic lime, magnesium nitrate and sulfate; sulphur as the calcium, magnesium or ammonium salt; the transition metals, iron, copper, manganese and zinc, generally added as chelates, oxides or sulfates; boron as an oxide or complex salt with calcium or sodium; and molybdenum as one of the molybdate salts.

The twelve elements listed above plus chlorine are generally thought to be the only required mineral nutrients for plants. Much research has shown that another element, silicon, is also a required element for certain plants and levels above the critical requirements provide significant benefits to many plants. Silicon is the second most abundant element in soils, the mineral substrate for most of the world's plant life. The soil water or the "soil solution" contains silicon, mainly as silicic acid, $H_4SiO_4$, at 0.1–0.6 mM concentrations on the order of potassium, calcium, and other major plant nutrients, and well in excess of phosphate. Silicon is readily absorbed so that terrestrial plants contain it in appreciable concentrations, ranging from a fraction of 1% of the dry matter to several percent, and in some plants to 10% or even higher. In spite of this prominence of silicon as a mineral constituent of plants, it is not counted among the elements defined as an "essential" nutrient, for any terrestrial higher plants except members of the Equisitaceae family. For that reason it is not included in the formulation of any of the commonly used nutrient solutions. The plant physiologist's solution-cultured plants are thus anomalous, containing only what silicon is derived as a contaminant of their environment. Ample evidence is presented that silicon, when readily available to plants, plays a large role in their growth, mineral nutrition, mechanical and resistance to fungal diseases, herbivory, and adverse chemical conditions of the medium.

A person of ordinary skill in the art knows the definition of a "soilless" medium. The term "soilless" does not include hydroponic systems, such as recirculating nutrient solutions. The term relates primarily to solid media which are mostly organic in nature, with some non-organic additives and nutrients. In addition, discoveries with regard to one of these types of media are not always transferrable to the other types of media. The prior art reveals the use of silicon additives in field soils and hydroponic systems.

As shown in the article "Growth Enhancement of Loblolly Pine (*Pinus taeda* L.) Seedlings By Silicon", by Emadian and Newton, dated 1989, the addition of a silicate solution to the fertilizer solution enhanced the growth of loblolly pine, *Pinus taeda*, and there were no nutrient imbalances in the tissue of the plants grown without the silica solution. Silicon treated plants under water stress showed an even larger growth difference than the controls under water stress. These are particularly important observations since the plants were grown in a substrate consisting of sand and fritted clay. This shows the importance of the solubility of the silicon source since sand is $SiO_2$ but the silicon is not available.

Although iron and manganese are required elements for plant growth, excessive amounts of these elements in the tissue of many commercially valuable plants, including geraniums and New Guinea and other impatiens cause necrotic spots, leaf yellowing and reduced overall growth, as shown in the article "Effect of Silicon on Manganese Tolerance of Bean Plants (Phaseolus Vulgaris L.), by Horst and Marschner, dated 1978. The addition of Aerosil, a submicrospic form of $SiO_2$, to solution cultured bean plants, Phaseolus Vulgaris L., dramatically improved the tolerance to toxic concentrations of manganese. For example, 100 ppm of manganese produced necrotic spots in the leaf through the deposition of manganese, but in the presence of silicon the plants could tolerate up to 1000 ppm of manganese without the damage appearing.

In the article titled "The Effects of Silicon on Cucumber Plants Grown in Recirculating Nutrient Solution", by Adatia and Besford, dated 1986, cucumber plants (*Cucumis sativus*) were grown in recirculating nutrient solutions containing either 10 ppm $SiO_2$, or 4.7 ppm Si (low Si), which was the level present in the water supply, or given and additional 100 ppm $SiO_2$ or 47 ppm Si (high Si). The high silicon leaves were more rigid, darker green, had shorter petioles and an increased fresh weight per unit area, dry weight per unit area and chlorophyll content. Furthermore, the low Si plants were much more susceptible to powdery mildew fungus *Sphaerotheca fuliginea*. All these positive effects were caused by an increased silicon concentration in the leaves ranging from 30 to 200% higher. These results show that even if there are levels of silicon in the root solution sufficient to prevent classic silicon deficiencies the plant still benefits from the additional silicon.

Similar results were reported for tomato plant growth in the article titled "Silicon Deficiency of Tomato Plant", by Miyake and Takahishi, dated 1978. Plants grown in 5 solutions containing as little as 5 ppm $SiO_2$ did not show signs of Si deficiency but were shorter, and smaller in both fresh and dry weights than plants grown in solutions containing 100 ppm $SiO_2$.

Adverse effects were noted in soybeans grown in silicon-deficient solutions, including malformed leaves and inferior growth, in the article titled "Effect of Silicon on the Growth of Soybean Plants in a Solution Culture", by Miyake and Takahishi, dated 1985, and strawberry plants, lower dry weight and lower yields of fruit, grown in Si deficient solutions in the article titled "Effect of Silicon on the Growth and Fruit Productions of Strawberry Plants in a Solution Culture", by Miyake and Takahishi, dated 1985.

All these results further prove that even if the plants are not exposed to silicon levels sufficient to prevent the classic deficiency symptoms, the plant still benefits from the additional silicon. The information right now does not allow one to predict the minimum level necessary to improve the growth of plants. This is a very complicated problem and depends on the species of plant, its silicon requirements for benefits and likely the method by which silicon is transported into the plant and leaves. Consequently, soil solutions of silicon duplicating those of native soils would represent a minimum value to duplicate the growth of plants that is observed in native soil.

The patent by Sterrett, U.S. Pat. No. 4,067,716, describes "soilless" media containing combusted bark and the twelve commonly described inorganic plant nutrients.

The patent by Segawa et al, U.S. Pat. No. 4,293,523, describes a process for preparing a potassium silicate fertilizer for use in field agriculture.

The patents by Willard, U.S. Pat. Nos. 4,067,712, 4,067,713, and 4,067,714, describe the preparation and use of a catalyst containing silicon to improve the growth of plants. Willard states that in practicing his invention, soil to be treated is intimately contacted with water containing a catalytically effective amount of the catalyst. He further states that said water need contain only 0.000001 ppm of the catalyst.

Vlnaty, U.S. Pat. No. 5,030,267, teaches how to prepare a slow release fertilizer coated with silicates and cement. This fertilizer was used only in field agriculture where natural soil is used, not a soilless medium, and where additional silicon is not believed to be needed.

SUMMARY OF THE INVENTION

The invention is directed to a soilless growth medium. It includes a core material, which may be any of a variety of standard media, such as sphagnum peat moss, hypnum peat, reed sedge peat, combusted, composted or fresh bark, composted organic wastes, perlite, expanded volcanic ash, vermiculite, expanded plastics, and mixtures thereof. The soilless growth medium should also include a soluble silicon in sufficient concentration to raise the level of silicon absorbed by the plant to a level such that phytoliths are formed and such that the plant shows increased drought resistance, structural stability, and resistance to poisons. The soilless growth medium may also include other standard supplements, such as nitrogen, phosphorous, calcium, magnesium, sulfur, one or more transition metals, boron, molybdenum, or chlorine.

The soilless growth medium should have a pH of between about 4.5 and about 7.5. The soilless growth medium may be made of between about 50% and about 75% sphagnum peat moss. It may also be at least 25% aggregate. The aggregate may be perlite, sand, bark, vermiculite, composted bark, aged bark, and the like, or mixtures thereof.

The soluble silicon may be in the form of wollastonite. The source of soluble silicon may be added in solid form and may have a variety of particle sizes in order to provide a repeating source of silicon to a plant grown in the medium. The source of soluble silicon may have a particle size of less than about 840 microns. At least about 80% of the source of soluble silicon may have a particle size less than about 420 microns. At least about 75% may have a particle size less than about 149 microns. At least 25% may have a particle size of less than about 74 microns.

The soilless growth medium should include soluble silicon in sufficient concentration that it is available for absorption by the plant to increase the concentration of silicon mineral in a plant when that plant is compared with a plant which is grown in the same soilless growth medium but without the source of soluble silicon. The increase in silicon mineral concentration induced in the plant may be at least 100%. The increase may be as high as 1000% or more. This level of soluble silicon must be at least 20 ppm.

In describing the preferred embodiment of the invention, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION OF THE PREFERRED EMBODIMENT

This invention provides a soilless growth medium with a source of soluble silicon available to contact the roots of plants at a concentration approaching, equaling or even exceeding that found in native soils. This invention maintains the higher silica concentration for an extended period, sufficient to produce the growth improvements described above and to be further detailed later herein. The invention provides the appropriate amount of silicon in soluble form to the plants and maintains the pH of the medium solution between 4 and 7.5.

The primary portion of the soilless growth medium is a core material. The core material may be selected from the following: sphagnum peat moss, hypnum peat, reed sedge peat, combusted bark, composted bark, fresh bark, composted organic wastes, perlite, expanded volcanic ash, vermiculite, expanded plastics, and mixtures thereof. Preferably, the core material is a mixture, which is between about 50% and about 75% sphagnum peat moss by volume and is at least about 25% aggregate by volume. The aggregate, for example, may be any of perlite, vermiculite, sand, composted pine bark, aged bark, or mixtures thereof.

Many natural and synthetic materials are potentially useful for this invention as a source of soluble silicon. Several characteristics are important: absolute solubility, rate of solution, effect on pH, effect on the physical properties of the medium and the particle size of the material. Useful materials are listed below:

Various sources Of $SiO_2$, particularly the amorphous materials such as fumed silica and diatomaceous earth, the remains of diatoms, very finely powdered glass and sand of particles less than 100 mesh size.

Silicic acid, $H_4SiO_4$ is a potential source if the pH is maintained in the proper range.

Alkali metal silicates such as the potassium and sodium varieties, the ratio of metal to silicon is not critical.

Natural calcium silicates such as $CaSiO_3$ (pseudowollastonite), $CaSiO_3$ (wollastonite), beta $Ca_2SiO_4$ (lamite), gamma $Ca_2SiO_4$ (olivine).

Natural calcium aluminum silicates such as $CaAl_2Si_2O$, (Ca-glass), $CaAl_2SiO_6$ (pyroxene), $CaAl_2Si_2O_8$ (hexagonal anorthite), $CaAl_2Si_4O_{12}2H_2O$ (wairakite), $CaAl_2Si_2O$ (anorthite), $CaAl_2Si_2O_82H_2O$ (lawsonite), $Ca_2Al_4Si_8O_{24}$ $7H_2O$ (leonhardite).

Natural calcium magnesium silicates such as $CaMgSi_2O_6$ (diopside)

Natural magnesium silicates such as $Mg_{1.6}Fe_{0.4}SiO_4$ (olivine), $Mg_2SiO_4$ (foresterite), $MgSiO_3$ (clinoenstatite), $Mg_3Si_4O_{10}(OH)_2$ $2H_2O$ (vermiculite), $MgCaSi_2O_6$ (diopside), $Mg_3Si_2O_5(OH)_4$ (chrysotolite), $Mg_2Si_3O_5(OH)_4$ (sepiolite), $Mg_6Si_4O_{10}(OH)_8$ (serpentine), $Mg_3Si_4O_{10}(OH)_2$ (talc). These compounds are ranked in order of solubility, with olivine being most soluble.

The relative solubilities of the complex calcium silicates are as follows: $CaAl_2Si_2O_8$ (Ca-glass)>$CaAl_2SiO_6$ (pyroxene)>beta $Ca_2SiO_4$ (lamite)>gamma $Ca_2SiO_4$ (olivine)>$CaAl_2Si_2O_8$ (hexagonal anorthite) >$CaAl_2Si_4O_{12}2H_2O$ (wairakite)>$CaSiO_3$ (pseudowollastonite)>$CaAl_2Si_2O_8$ (anorthite)>$CaSiO_3$ (wollastonite)>as $CaMgSi_2O_6$ (diopside)>$CaAl_2Si_2O_8$ $2H_2O$ (lawsonite)>$Ca_2Al_4Si_8O_{24}$ $7H_2O$ (teonhardite)

Most of the natural silicates are unstable under acidic conditions i.e. <pH 7.5 but the reactions are extremely complex. A detailed discussion of the many equilibria can be found in the Lindsay book, *Chemical Equilibria in Soils*, which incorporated herein by reference to the extent necessary for a full understanding of the invention.

The sources of silica mentioned above can be used to achieve the objectives of the invention. All the calcium silicates and aluminosilicates and magnesium silicates mentioned above can be used as liming agents. An example is shown below:

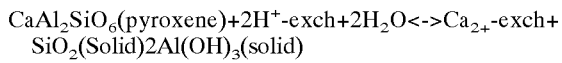

The $SiO_2$ produced as shown above will then establish the equilibrium with silicic acid shown in a later equation.

A critical consideration in the present invention is that the silicon be added to the material in a form in which it is sufficiently soluble to provide silicon available for absorption by the plant. Thus, any of the above list of materials are considered soluble. The solubility of the material differs based on the characteristics mentioned above. For example, it is known to one of ordinary skill in the art that a one square foot of plate glass, while technically being a source of soluble silicon, is not suitable for the present invention, as it will not have an appropriate level of solubility. Finely powdered glass having a particle of less than about 149 microns does have an appropriate level of solubility. The Lindsay reference mentioned above is known to those skilled in the art and will assist one of ordinary skill in the art to select an appropriate source of soluble silicon without undue experimentation.

The solubility of silicon in the soil is controlled by complex equilibria but is about $10^{-3.10}$ M when the pH is around 7. This is the area of interest for plant growth. This corresponds to 22 ppm Si. The most soluble source of silicon is amorphous silica, $SiO_2$, with a solubility of $10^{-2.74}$ M. This corresponds to 51 ppm Si. The following reaction will likely control the solubility of silicon in the growth medium of this invention;

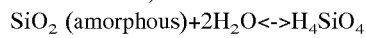

Therefore, a source of soluble silicon, even if more soluble than the equation above, will often result in soil concentrations of Si around 20 to 50 ppm Si or less. This is because the concentrations of various other ions affect the solubility of silicon. Supersaturated conditions can occur however and concentrations higher than these have been observed. It is preferred that the silicon concentration in the soilless growth medium be at least 20 ppm. Such a concentration is sufficient in many plants to achieve the production of phytoliths and the resultant improvements.

TABLE 1

| LIME<br>Grams/liter medium | VANSIL W-10<br>Gram Calcium<br>silicate/liter medium | pH | Si, ppm |
| --- | --- | --- | --- |
| 0 | 0 | 3.1 | 7 |
| 5 | 0 | 5.8 | 11 |
| 5 | 2 | 6.5 | 31 |
| 3 | 2 | 6.4 | 29 |
| 0 | 5 | 6.6 | 32 |
| 7 | 0 | 6.0 | 11 |

The data in Table 1 illustrates several important points. At zero lime and calcium silicate note that 7 ppm Si was present. As will be shown later, levels such as these represent the background level. As the pH increased, through the addition of lime in a concentration of 5 grams per liter of core material, the concentration of Si increased to 11 ppm. This is consistent with the increased solubility of the soluble silicon source as the pH increases. The next row shows a tripling of Si through the addition of calcium silicate in a concentration of 2 grams of calcium silicate per liter of core material. This level of soluble silicon is about midway between the expected levels as discussed earlier. The next row illustrates that the calcium silicate at the 5 gm/l level and zero lime, both adds silicon and increases the pH of the medium. In fact the calcium silicate appears to increase the pH more than an equivalent amount of lime. This may be a function of the small particle size of the silicate. These data demonstrate clearly that calcium silicate can be used to increase the concentration of Si.

The data in Table 1 were generated by adding the stated amounts of either dolomitic lime(100% passes through an 840-micron screen; 53.5% $CaCO_3$, 42.0% $MgCO_3$) or Vansil W-10, which is $CaSiO_3$ (wollastonite purchased from R.T. Vanderbilt Co., 97% passing through a 74-micron screen, median particle size 15.6 um) or combinations of both to a core material composed of 75% Canadian sphagnum peat moss and 25 perlite, a nutrient charge, and a wetting agent. This core material is equivalent to the commercial medium, Sunshine Mix #1, produced by SunGro Horticulture of Bellevue, Wash. except that the normal charge of dolomitic limestone was left out. Typical physical and chemical properties of this core material are shown in table 2.

TABLE 2

| | |
|---|---|
| Bulk density lb/cf | 8.3 |
| Fully wetted density lb/cf | 50 |
| Air capacity, % by volume | 18.5 |
| Water capacity, % by volume | 60 |
| pH | 6.0 |
| EC, mmhos/cm | 1.3 |
| $NO_3$—N, ppm | 45 |
| $NH_4$—N, ppm | 23 |
| P, ppm | 30 |
| K, ppm | 125 |
| Ca, ppm | 130 |
| Mg, ppm | 65 |
| S, ppm | 148 |
| Mn, ppm | 1.8 |
| Fe, ppm | 1.1 |
| Cu, ppm | 0.16 |
| B, ppm | 3.5 |
| Zn, ppm | 0.53 |
| Mo, ppm | 0.13 |

The effect of particle size on pH and soluble silicon is shown in tables 3, 4, and 5. The calcium silicate products, TYAD FP, NYCOR R, and NYAD G are products of NYCO Minerals of New York State. The VANSIL W-10 is a wollastonite from R.T. Vanderbilt Company of New York State.

TABLE 3

| Rate, grams/liter medium | NYAD FP (2000-149 microns) pH | NYCOR R (75% passes through a 74- micron screen) pH | NYAD G (149-44 microns) pH | VANSIL W-10 (97% passes through a 74- micron screen) pH |
|---|---|---|---|---|
| 0 | 3.8 | 3.8 | 3.8 | 3.8 |
| 1 | 3.8 | 4.0 | 4.1 | 4.2 |
| 2 | 3.8 | 4.4 | 4.4 | 4.7 |
| 3 | 3.9 | 4.5 | 4.6 | 5.1 |
| 5 | 3.9 | 5.1 | 5.2 | 6.4 |
| 8 | 4.0 | 6.1 | 5.9 | 7.4 |
| 10 | 4.1 | 6.4 | 6.2 | 7.6 |

In table 3 the calcium silicate product NYAD FP has a particle size range of 2000–149 microns and does not affect the pH of peat (Sunshine sphagnum peat moss, available from Grower Grade Orange, Lameque Canada). The other three materials produce the expected increase in pH and the finest material, Vansil W-10, produces the largest increase at comparable levels.

TABLE 4

| Rate, grams/liter medium | NYAD FP (2000-149 microns) Si/ppm | NYCOR R (75% passes through a 74- micron screen) Si/ppm | NYAD G (149-44 microns) Si/ppm | VANSIL W-10 (97% passes through a 74- micron screen) Si/ppm |
|---|---|---|---|---|
| 0 | 8 | 8 | 8 | 8 |
| 2 | 13 | 23 | 25 | 29 |
| 5 | 17 | 28 | 26 | 39 |

Table 4 shows how the soluble silicon varies as a function of concentration and particle size. These data were measured in a saturated paste extract formed from a commercially available "soilless" medium and an addition of the noted quantity of silicate. (Sunshine Mix #4, available from Sun-Gro Horticulture Inc.) (Air capacity, 22.5% by volume; water capacity, 55% by volume; other typical physical and chemical properties of this mix are the same as shown in Table 2). The formation of the saturated paste extract is a commonly known process, but is fully discussed in the Appendices to provisional application Ser. No. 60/035,117 which are incorporated herein by reference. In the sample, NYAD FP produced an increase in silicon but it was approximately half that produced by the finer materials. Again, the finest material had the greatest effect and the concentration of silicon was significantly greater than the other samples.

TABLE 5

| $CaSiO_3$ grade | Si, ppm |
|---|---|
| NYAD FP (2000-149 microns) | 6 |
| NYCOR R (75% passes through a 74-micron screen) | 38 |
| NYAD G (149-44 microns) | 56 |
| VANSIL W-10 (97% passes through a 74-micron screen) | 70 |

Table 5 contains the results of solubility measurements of the four sources of calcium silicate in distilled water. Ten grams of each sample were added to 100 ml of water and the samples allowed stand overnight. The samples were filtered and analyzed by ICP. Silicon concentrations followed the same pattern as in the previous 5 table.

The conclusions that are evident from the first five tables are:

Calcium silicate can provide soluble silicon to "soilless" mixes at levels equivalent to that observed in native mineral soil or even greater.

Calcium silicate can raise the pH of peat and peat-based mixes.

Both effects increase as the particle size of the silicates decreases.

Thus, a preferred embodiment of the invention can be described. The addition of a soluble source of silicon of the proper particle size distribution to a core material can produce soluble silicon levels in the medium equivalent to, or greater than, those found in native mineral soil. Furthermore, proper choice of materials and particle size distribution can produce a soilless medium with a pH range between 4.5 and 7.5. The source and particle size distribution produce the desired effects for a period essentially equivalent to the length of the crop time.

The selection of an appropriate source of soluble silicon can provide a repeating source of soluble silicon. It is desirable to put a set of additives in the core material once, then plant whatever is desired to be grown, and thereafter add only water and fertilizer. If the source of soluble silicon is selected properly, the addition of only water will provide a repeating source of soluble silicon. As demonstrated above, a single material which is a source of soluble silicon does not have a constant solubility, but varies based on particle size. Thus, if the source of soluble silicon is added in different particle sizes, the plant can absorb the soluble silicon over a period of time. An appropriate level of silicon mineral in a plant can thus be maintained over a growing season.

A preferred embodiment of the invention is 600–6000 grams of wollastonite of the particle size distribution shown in table 6, per cubic meter of "soilless" medium.

TABLE 6

| Screen size | % passes through (by volume) |
| --- | --- |
| 20 mesh (840 microns) | 100 |
| 40 (420-micron) | 80 |
| 100 (149-micron) | 75 |
| 150 | 50 |
| 200 (74-micron) | 25 |

A further embodiment is the substitution of the silicate source for some or all of the lime used in the medium: For example, 2000 grams of wollastonite plus 3109 grams of dolomitic lime, instead of 5109 grams of dolomite, per cubic meter of soilless medium (as is used with Sunshine Mix #1 in standard procedures). The substitution of the source of soluble silicon for a portion of the amount of lime typically used is desirable in order to maintain the pH of the soilless growth medium between about 4 and about 7.5. As shown above (Table 1), both the addition of lime and the addition of the source of soluble silicon independently increase the pH of the core material. The addition of both lime in its usual amount and a source of soluble silicon tends to increase the pH over a desirable level. Thus, a decrease in the amount of lime added by an amount equal to the amount of the source of soluble silicon added is desirable.

The example shown above refers to the source of silicon as wollastonite but one skilled in the art can use the solubility figures in the Lindsay reference to adjust the concentration and particle size distribution to achieve the desired results with many if not all of the listed sources.

Care must be taken when using alkali metal silicates. These materials are very soluble and increase the pH of the soilless medium rapidly. Appropriate calcium and magnesium must be provided if the dolomitic lime normally used is left out. A preferred embodiment with the metal silicates is 1413 grams of potassium silicate per cubic meter of soilless media.

EXAMPLE 1

| Mix | Silicon form | Grams per ft$^3$ | Initial pH | Silicon content in leaves, wt. % |
| --- | --- | --- | --- | --- |
| Mix #1 | Potassium silicate | 30.5 | 6.25 | 0.46 |
| Mix #1 | Potassium silicate | 91.6 | 8.00 | 0.70 |
| Mix #1 | Silica sol | 30.5 | 5.35 | 0.38 |
| Mix #4 | Silica sol | 91.6 | 5.25 | 0.56 |
| Mix #1 | | 0 | 5.30 | 0.30 |

Example 1 proves that different forms of silicon can be used to accomplish the intent of the invention, here, increasing the level of silicon mineral in a squash plant. The addition of a source of soluble silicon increased the amount of silicon mineral in a squash plant over the amount of silicon mineral in the plant when the plant was grown in the core material alone (line 5). The level of increase is between 26% and 233%. The higher amount of potassium silicate added (the second line) raised the pH above the desired level, i.e., between about 4 and about 7.5, because the Sunshine Mix #1 contained its normal complement of dolomitic lime. Reduction or removal of the lime would alleviate the problem. The silica sol is amorphous $SiO_2$ and the potassium silicate is an alkali metal silicate.

EXAMPLE TWO

A very large experiment was carried out at multiple locations. The two treatments were: (1) the core material alone, here, Sunshine Mix LC1 prepared on a commercial scale at a SunGro Horticulture Inc. production plant under normal production conditions (Sunshine Mix LC1 is identical in composition to Sunshine #1, the composition which was described earlier), and (2) the core material with a source of soluble silicon, here, VANSIL W-10 was added at a concentration of 2 grams/liter and dolomitic lime at a concentration of 3.109 grams/liter to the LC1 mix during production using a solid dispenser equivalent to that used to add lime. The first treatment, regular LC1 mix, had 5.109 grams of dolomitic lime per liter of the mix. The presence of calcium silicate and the amounts of lime were the only differences between the mixes. Both treatments used the same amounts of peat, perlite, fertilizer and wetting agents from the same sources. The first treatment had a Si level of 11 ppm and the second treatment had a Si level of 22 ppm.

Plants were grown in the two soilless mediums described above and otherwise were treated equally to compare the effect of the two mediums.

The concentration of silicon in the leaf tissue of a number of plants grown with and without calcium silicate are shown in table 7.

TABLE 7

| PLANT | MEDIUM | SILICON CONTENT PPM |
| --- | --- | --- |
| Cucumber | with Calcium Silicate | 8141 |
| Cucumber | without Calcium Silicate | 2429 |
| Impatiens | with Calcium Silicate | 1128 |
| Impatiens | without Calcium Silicate | <33 |
| Grass | with Calcium Silicate | 3218 |
| Grass | without Calcium Silicate | 405 |
| Petunias | with Calcium Silicate | 2299 |
| Petunias | without Calcium Silicate | 833 |
| Marigolds | with Calcium Silicate | 283 |
| Marigolds | without Calcium Silicate | <33 |
| Snapdragons | with Calcium Silicate | 659 |
| Snapdragons | without Calcium Silicate | <33 |

The plants were grown as described above. Note that the plants grown with calcium silicate additives had from about 200% to more than 3000% more silicon in their tissue.

The following plants were grown at a total of 11 locations: Ageratum; Alyssum; Bean; Begonia; Celosia; Coleus; Cucumber; Cyclainen; Exacum; Boston Fem; Geranium; Gerbera; Gloxinia; Grass; Impatiens; New Guinea Impatiens; Kalanchoe; Lantana; Lisianthus; Marigold; Mum; Pansy; Petunia; Radish; Rudbeckia; Snapdragon; Streptocarpus; Tobacco; Torenia; Tomato; Vinca; Verbena; African Violet; and Zinnia.

The plants were grown at 8 commercial greenhouses, 2 universities and 1 R&D facility under their particular environmental conditions and fertilization practices. All growers reported equal or better growth with the second treatment than with the first. Many locations reported better growth, earlier flowering, stronger stems and overall better growth.

Seed geraniums are sensitive to a toxicity caused by iron and manganese and under severe conditions makes the plant unsalable. The symptoms are necrotic spots on middle leaves followed by yellowing and ultimate abscission of the affected leaves. Twenty five percent of the CV Pinto Red plants grown in the second treatment had no symptoms at all and the remainder had mild symptoms. All plants grown in the first treatment had moderate to severe symptoms.

Petunia plants, Cv Pink Dreams, grown in the second treatment (general cultural conditions: temperature of 68–75° F.; liquid feeding with Technigro 17-5-24 at 225 ppm N) had more flowers after 51 days of growth than plants grown in the first treatment.

Snapdragon plants, Cv Floral Showers White, grown in the second treatment, had stiffer stems and a more upright habit than those grown in the first treatment.

Grass (*Lagurs ovatus*) grown under the conditions listed above, had stiff, flat leaf blades when grown in the second treatment whereas the plants grown in the first treatment had curled leaf blades.

The critical aspect, as mentioned earlier, is to add sufficient silicon to the soilless medium in a form which can be absorbed by plants. If sufficient soluble silicon is added to the core material in a soilless growing medium, the plants absorb the silicon mineral and can form phytoliths which aid, among other things, in structural stability. It is important that the level of silicon mineral in plants is increased over the amount which the plants receive in a soilless medium lacking the added source of soluble silicon. As was seen above, the addition of the appropriate amount of soluble silicon with an appropriate particle size can increase the amount of silicon mineral in a plant by at least 26%. It is preferable that soluble silicon be added to the core material in sufficient concentration to increase the concentration of silicon material in a plant by at least 26% when the plant is grown in the soilless growth medium as compared to a plant grown in the core material without the added source of soluble silicon, all other additives being equal. The amount of silicon mineral required by any given plant varies. However, in order for the plant to receive certain beneficial results, the amount of soluble silicon in the soilless growth medium must be sufficient for the plant to form phytoliths. The phytoliths are an opal-like structure in the cell wall. It is the formation of these phytoliths which cause the plants to be drought resistant, more structurally stable, and to resist other types of damage.

The data in table 8 illustrate the increase in silicon in the medium extract and the increase in pH with time for a variety of plants grown in the second treatment. Both effects are as expected. These results show that the use of a repeating source of soluble silicon will cause an increase in the pH and concentration of silicon mineral in a core material, and that the increase in pH and concentration of silicon continue over time. The growing season is typically longer than the two weeks shown, but it should be clear that the increase in pH and concentration of silicon mineral continue throughout the growing season, and this may be extrapolated from these results.

TABLE 8

| Time | Crop | pH | Si, ppm |
| --- | --- | --- | --- |
| 0 | Unused | 5.2 | 22 |
| Week 1 | Radish | 6.0 | 40 |
| Week 1 | Tomato | 5.8 | 31 |
| Week 2 | Cucumber | 6.2 | 37 |
| Week 2 | Marigold | 6.2 | 41 |
| Week 2 | minus plant | 5.9 | 26 |

Table 9 illustrates the importance of the choice of sources of silicon and furthermore, that normal "soilless" media do not contain enough soluble silica to produce the elevated silicon concentrations necessary to produce the beneficial effects.

TABLE 9

| GROWTH MEDIUM | COMPOSITION | SILICON CONC. PPM | PRODUCER |
| --- | --- | --- | --- |
| Sunshine Mix #1 | 75% peat, 25% perlite | 11 | SunGro Horticulture Bellevue WA |
| Sunshine Mix LC1 | 75% peat, 25% perlite | 8 | SunGro Horticulture Bellevue WA |
| Sunshine Mix LC1 plus Calcium Silicate | 75% peat, 25% perlite | 22 (Fresh) | SunGro Horticulture, Bellevue, WA |
| Sunshine LBU1 Bulb Mix | 75% peat, 25% perlite, 5% sand | 7 | SunGro Horticulture, Bellevue, WA |
| Sunshine LG3 | 75% peat, 25% vermiculite | 11 | SunGro Horticulture, Bellevue WA |
| Sunshine Mix #4 | 60% peat, 40% perlite | 12 | SunGro Horticulture, Bellevue WA |
| Sunshine LA4 | 60% peat, 40% perlite | 7 | SunGro Horticulture, Bellevue WA |
| Sunshine SB1 | 60% peat, 20% perlite, 20% bark | 13 | SunGro Horticulture, Bellevue WA |
| Premier ProMix | 75% peat, 12.5% perlite, 12.5% vermiculite | 11 | Premier Horticulture, Dorval, Quebec |
| Metro 700 | 25% peat, 5% perlite, 15% vermiculite, 55% composted pine bark (0–5.85-8/") | 12 | Scotts Company, Marysville, OH |
| Fafard Mix #3B | 30% peat, 15% perlite, 15% vermiculite, 40% aged bark | 6 | Conrad Fafard, Inc. Agawam, MA |

Note that no mixes without the addition of a source of soluble silicon contained more than 13 ppm soluble silicon in the saturated paste extract (this technique was mentioned above). The average for all mixes was 9.8 ppm. The presence of calcium silicate raised the Si content to as much as 41 ppm, (see table 7) an increase of about 400% above the average of the ten mixes not having the added Si. These mixes alone are ineffective to maintain or increase the level of silicon mineral in plants, as the mixes do not provide the 20–50 ppm of soluble silicon as found in most soil, and which is needed for most plants to form phytoliths, causing beneficial results.

The importance of chemical source and particle size are proved by the fact that the media containing either sand or vermiculite, both silicate containing materials, do not show elevated levels of soluble silicon. The same is true of mixes containing mineral wool and glass fibers. Eight grams of rockwool added to 100 ml of water gave Si concentration of 8 ppm.

While certain preferred embodiments of the present invention have been disclosed in detail, it is to be understood that various modifications may be adopted without departing from the spirit of the invention or scope of the following claims.

We claim:

1. A soilless growth medium, comprising:
   a core material having between about 50 to 75 percent sphagnum peat moss and up to about 25 percent of aggregate on a volume basis;
   a source of soluble silicon having a solubility sufficient to maintain a concentration of about at least 20 ppm of silicon mineral in said medium available for absorption by a plant such that said plant shows increased drought resistance, structural stability, or resistance to diseases, insects, or toxic materials; and one or more of the following: nitrogen, phosphorous, potassium, calcium, magnesium, sulfur, one or more transition metals, boron, molybdenum, or chlorine, wherein said soilless growth medium has a pH between about 3.8 and about 7.6.

2. The soilless growth medium according to claim 1, wherein said core material is selected from among the following: sphagnum peat moss, hypnum peat, reed sedge peat, combusted bark, composted bark, fresh bark, composted organic wastes, perlite, expanded volcanic ash, vermiculite, expanded plastics, and mixtures thereof.

3. The soilless growth medium according to claim 1, wherein said soluble silicon is wollastonite.

4. The soilless growth medium according to claim 1, wherein said soilless medium has a pH between about 4.5 and about 7.5.

5. The soilless growth medium according to claim 1, wherein at least about 80% by volume of said soluble silicon has a particle size of less than about 420 microns.

6. The soilless growth medium according to claim 1, wherein at least about 75% by volume of said soluble silicon has a particle size of less than about 149 microns.

7. The soilless growth medium according to claim 1, wherein at least about 25% by volume of said soluble silicon has a particle size less than about 74 microns.

8. A soilless growth medium, comprising:

sphagnum peat moss; and a source of soluble wollastonite having a particle size less than about 840 microns in sufficient concentration to maintain the level of silicon mineral absorbed by a plant such that said plant shows increased drought resistance, structural stability, or resistance to diseases, insects, or toxic materials, wherein said soilless growth medium has a pH between about 3.8 and about 7.6.

9. The soilless growth medium according to claim 8, wherein at least about 80% by volume of said soluble silicon has a particle size of less than about 420 microns.

10. The soilless growth medium according to claim 8, wherein at least about 75% by volume of said soluble silicon has a particle size of less than about 149 microns.

11. The soilless growth medium according to claim 8, wherein at least about 25% by volume of said soluble silicon has a particle size of less than about 74 microns.

12. The soilless growth medium according to claim 9, wherein at least about 75% by volume of said soluble silicon has a particle size of less than about 149 microns.

13. The soilless growth medium according to claim 9, wherein at least about 25% by volume of said soluble silicon has a particle size less than about 74 microns.

14. The soilless growth medium according to claim 10, wherein at least about 25% by volume of said soluble silicon has a particle size less than about 74 microns.

15. A soilless growth medium, comprising:

sphagnum peat moss; and a source of soluble wollastonite having a solubility sufficient to maintain a concentration of about at least 20 ppm of silicon mineral in the medium, wherein said soilless growth medium has a pH between about 3.8 and about 7.6.

16. The soilless growth medium according to claim 15, further comprising one or more of the following: nitrogen, phosphorous, potassium, calcium, magnesium, sulfur, a transition metal, boron, molybdenum, or chlorine.

17. The soilless growth medium according to claim 15, wherein said soilless medium has a pH between about 4.5 and about 7.5.

18. The soilless growth medium defined in claim 15 wherein said source of soluble silicon has a particle size of 840 microns or less.

19. The soilless growth medium defined in claim 18 wherein at least about 25 percent by volume of said source of soluble silicon has a particle size of less than about 74 microns.

20. The soilless growth medium defined in claim 15 wherein at least 75 percent by volume of said source of soluble silicon has a particle size distribution of less than about 420 microns.

* * * * *